3,153,005
SOLID ELASTOMERIC POLYESTER RESINOUS MOLDING COMPOSITIONS AND ELECTRICAL MEMBERS INSULATED THEREWITH

Herbert F. Minter, Pittsburgh, Pa., assignor to Westinghouse Electric Corporation, East Pittsburgh, Pa., a corporation of Pennsylvania
No Drawing. Filed Aug. 23, 1961, Ser. No. 133,318
3 Claims. (Cl. 260—40)

The present invention relates to molding compositions and has particular reference to elastomeric polyester resinous molding compositions adapted for use in insulating electrical apparatus.

The present invention is a continuation-in-part of copending applications Serial No. 647,748, filed March 22, 1957, and Serial No. 745,847, filed July 1, 1958, both assigned to the assignee of the present invention and now abandoned.

In the electrical industry there is a need for resinous molding compositions which will thermoset to tough, elastomeric products in a relatively short period of time. To be completely satisfactory as insulation for electrical apparatus, such moldable compositions should have a high tensile strength, high percent elongation, high temperature stability, and low water and oil absorption. Such compositions also must be adaptable for molding about electrical conductors and be capable of withstanding cycling over extreme temperature ranges without cracking or separating from such conductors.

In application, Serial No. 399,576, filed December 21, 1953, now U.S. Patent No. 2,871,420, issued January 27, 1959, which is assigned to the assignee of the present invention and which was copending with the foregoing applications, there are disclosed resinous molding compositions which to a large degree meet the requirements of moldable elastomeric insulating compositions as set forth hereinabove. The compositions disclosed in said patent are derived by reacting, under certain specified conditions, one mol of at least one unsaturated acid, such as fumaric acid or the like, and from 10 to 15 mols of adipic acid with certain glycols.

It has now been discovered that resinous molding compositions characterized by elastomeric properties which are greatly improved over those of Patent No. 2,871,420, as well as by improved physical and electrical properties, are obtainable by employing specific polyester resins obtained by substituting a small to substantial proportion of the adipic acid by isophthalic acid. The discovery was entirely unexpected in view of the known chemical fact that orthophthalic acid, for example in similar polyester compositions, produces brittle, glassy material. It has been further discovered that polyester resins having greatly improved physical and electrical properties are obtained by including with the glycols employed certain proportions of 2,2-dimethyl propanediol-1,3, referred to hereinafter as neopentyl glycol.

It is a primary object of the present invention to provide moldable resinous compositions including mixtures of certain specific polyester resins and finely divided fillers which are thermosettable to tough elastic products.

A further object of the invention is to provide molded thermoset resinous compositions which are tough and elastomeric and comprise mixtures of finely divided fillers and specific polyester resins obtained by reacting certain glycols with isophthalic acid and other acidic components.

Other and further objects of the invention will in part be obvious and will in part appear hereinafter.

Broadly, in accordance with the present invention and in the attainment of the foregoing objects there are provided elastomeric polyester molding compositions comprising: (A) from 10 to 70 parts by weight of a solid filler and (B) from 90 to 30 parts by weight of a specific polyester resin, the total being 100 parts.

More specifically, the solid filler portion of the molding composition comprises a finely divided filler, at least 70 percent by weight of which is a non-fibrous solid filler of an average particle size no greater than one micron. Furthermore, the polyester resin is one derived by heating above 150° C. but not exceeding 250° C. (a) one mol of at least one unsaturated dicarboxylic acidic compound selected from the group consisting of fumaric acid, maleic acid, maleic anhydride, citraconic anhydride, citraconic acid, itaconic acid, and itaconic anhydride, (b) from 5 to 10 mols of adipic acid, (c) from 2 to 8 mols of isophthalic acid (d) from 5 to 10 mols of at least one glycol selected from the group consisting of ethylene glycol and propylene glycol, and (e) from 5 to 10 mols of neopentyl glycol, the glycols providing sufficient hydroxyl groups to exceed by at least 5% but not more than 15% the number of carboxyl groups in the acidic components (a), (b) and (c).

These resinous molding compositions cure to tough, elastomeric solids upon heating in the presence of from 0.5% to 5% by weight, based on the weight of the polyester resin, of at least one vinyl addition-type polymerization catalyst. The cured, solid, elastomeric products exhibit electrical, mechanical and chemical properties superior to those possessed by polyester resins heretofore known in the art.

The polyester resin material employed in formulating the resinous molding compositions may be prepared in accordance with usual esterification procedures. Thus, the acidic materials and glycols may be heated in the presence of one or more esterification catalysts, such as mineral acids including hydrochloric and sulfuric acid, or organic acids such as para-toluene sulfonic acid and the like. Preferably, the esterification reaction is carried out by heating the materials, in the amounts specified above, to a temperature within the range of about 150° C. to about 250° C. with gas sparging using nitrogen, hydrogen, or carbon dioxide. The heating of the mixture is continued with stirring until a polyester resin having an acid number below 12, and preferably below 5, is produced. The reaction is considered to be complete when the viscosity of a 50% polyester resin solution in monostyrene is about K to M on the Gardner-Holdt scale at 25° C. The viscosity of satisfactory polyesters in 50% solution in monostyrene may vary somewhat from these limits, for example from I to Q at 25° C.

The most satisfactory elastomeric products are obtained when the glycols used in forming the polyester consist essentially of from 5 to 10 mols of ethylene glycol or propylene glycol or mixtures thereof, and from 5 to 10 mols of neopentyl glycol. However, acceptable products are obtainable using less or even none of the neopentyl glycol. Thus, glycols such as diethylene glycol, 1,3-butylene glycol, and the like, may replace a part or all of the neopentyl glycol with the total amount of glycol comprising up to 20 mols in the products. Preferred compositions, however, are those containing neopentyl glycol in the proportions set forth hereinabove inasmuch as this particular glycol characterizes the resinous products by greatly improved physical and electrical properties.

I have found that glycerol or related compounds such as trimethylol ethane or trimethylol propane may be included in amounts of from 0.1 to 0.75 mol with advantage. The optimum elastomeric properties result from the use of 0.23 to 0.35 mol of glycerol per 13 mols of the acidic compounds. However, the glycerol or like compounds may be left out, and an excellent resinous composition is produced.

In preparing the polyester portion of the elastomeric composition of this invention, the isophthalic acid may be replaced at least in part by terephthalic acid or certain of its esters.

The polyester resinous material itself does not produce satisfactory resinous molding compositions if it simply is admixed with a polymerization catalyst and cured in the presence of heat to a thermoset solid. Satisfactory resinous molding compositions are obtainable only when from 10 to 70 parts by weight of a finely divided solid filler is admixed with from 90 to 30 parts by weight of the polyester resin. The fillers may include finely divided silica, calcium carbonate, aluminum silicate, magnesium silicate, talc, iron oxides, diatomaceous earth, hydrated alumina, indicated by the formula $Al_2O_3 \cdot 3H_2O$ or $Al(OH)_3$, hydrated silicates, mica, kaolin, bentonite, and glass. The particles should have an average particle size of less than 5 and preferably no greater than 1 micron. If desired, the particles of the filler may be coated with a minor amount of a resin such as a melamine resin, a soap such as aluminum or magnesium stearate, an oil, such as tall oil or a silicone oil, or a fatty acid such as stearic acid.

Additional reinforcing fibrous materials may be included in the composition to replace up to 30% of the weight of the solid fillers. Suitable fibrous fillers are asbestos, cotton, nylon, dacron, rayon, acrylonitrile resin fibers and glass fibers. The fibers may be chopped or finely divided depending on the size and shape of the moldings that are to be produced. Large moldings of several inches in size will permit the incorporation of fibrous reinforcing materials having lengths of up to an inch while smaller moldable members will permit the use of fibers of lengths of ¼ to ½ inch in the composition.

In preparing the resinous molding compositions the solid fillers are intimately admixed with the polyester resin in a suitable mixing device. Excellent results have been obtained by intimately admixing the ingredients employing a two-roll mill or a double-arm mixer. Inasmuch as a relatively large amount of filler is incorporated in the compositions, a relatively thick, high viscosity, soft, gum-like material is obtained. If desired, limited amounts of plasticizers such as tricresyl phosphate, dioctyl phthalate, neopentyl adipate and the like may be introduced into the composition to assist in maintaining the soft, gum-like nature of the resinous material during periods of storage.

While their use is not essential, a relatively small proportion of one or more polymerization inhibitors may be incorporated in the composition to aid in extending its storage or shelf life by preventing premature polymerization. Inhibitors which are suitable for this purpose include substituted phenols and aromatic amines. More specific examples of suitable polymerization inhibitors include hydroquinone, resorcinol, tannin, and sym. alpha, beta naphthyl p-phenylene diamine, and N-phenyl beta naphthylamine. The inhibitor, if employed, should be present in only relatively small proportions. Thus, amounts less than about 1.0% should be used, with amounts as small as about 0.01% to about 0.1% by weight generally being sufficient.

Prior to the intended use of the resinous molding composition a minor amount of at least one vinyl addition type polymerization catalyst is thoroughly admixed with the composition.

Polymerization catalysts which are suitable for incorporation in the composition are the organic peroxides and hydroperoxides used to effect vinyl-type addition polymerization. Compounds capable of furnishing free radicals which accelerate addition polymerization may be included with the peroxide catalysts. Examples of such catalysts are benzoyl peroxide, tertiary butyl hydroperoxide, ditertiary butyl peroxide, t-butyl perbenzoate, di-t-butyl di-perphthalate, p-chlorobenzoyl peroxide, dicumyl peroxide, and the like. The catalysts may be incorporated into the compositions several days previous to their being molded without any adverse results.

In order to indicate even more fully the nature and capabilities of the resinous molding compositions of the present invention, the following examples are set forth, in which all parts and percentages are by weight unless otherwise indicated.

*Example I*

A polyester resin is prepared by introducing the following ingredients into a reaction vessel equipped with a stirrer, an inlet for inert gas, and thermometer.

| Material: | Mols |
| --- | --- |
| Adipic acid | 6 |
| Fumaric acid | 1 |
| Isophthalic acid | 6 |
| Propylene glycol | 2.3 |
| Ethylene glycol | 12.0 |

The glycols are charged into the reaction vessel and heated to a temperature of from 140° to 160° C. with gas sparging using nitrogen, carbon dioxide, or hydrogen. Approximately half of the isophthalic acid then is added to the glycols and stirring and heating are continued until a clear solution is obtained. The temperature should not be allowed to exceed about 180° C. The remainder of the isophthalic acid then is added with stirring until the solution is clear. The resultant solution then is cooled to about 130° C. to 140° C. at which time the adipic and fumaric acids are added. The mixture then is heated to 225° C. and maintained at that temperature until the viscosity of the polyester has increased to a value of K on the Gardner-Holdt scale for a 50% solution in monostyrene at 25° C. The polyester will have an acid number of about 5 at that time.

It has been determined that esterification is aided when solvent distillation procedures are employed to carry off the water formed during the reaction. The removal of water formed during the esterification reaction is facilitated by carrying out the esterification in the presence of a volatile organic liquid such as toluene, xylene, or the like.

*Example II*

About 56.4% of the polyester prepared in accordance with the procedure described in Example I then is thoroughly admixed on a cold two-roll mill with about 43.6% of finely divided calcium carbonate having an average particle size about one micron until a uniform dispersion is achieved. Thereafter, there is added about 1.5% by weight of a 50% dispersion of benzoyl peroxide in tricresyl phosphate. After a few more minutes of milling a material of soft, gum-like consistency is obtained. The material is molded at 125° C., with a five minute cure, into panels 4 inches square having a thickness of about 90 mils. Samples are cut therefrom with an ASTM tensile specimen die D. Cross head speed of the tensile machine is 20 inches per minute and tests are conducted on the samples at approximately 25° C. The sample has a tensile strength of 855 p.s.i.; elongation at break of 225%; a weight loss after 28 days at 135° C. of 3.3%; water absorption after 24 hours of 0.6%; and an oil absorption after one week's immersion in petroleum oil at 135° C. of 0.3%. These test results demonstrate that the elastomeric molding composition of this invention have outstanding physical and chemical properties.

*Example III*

A polyester resin is prepared in accordance with the procedure described in Example I using the following ingredients.

| Material: | Mols |
| --- | --- |
| Adipic acid | 8 |
| Fumaric acid | 1 |
| Isophthalic acid | 4 |
| Neopentyl glycol | 3.4 |
| Ethylene glycol | 10.2 |

The resultant polyester is blended with filler in the manner described in Example II to provide a pasty-like molding composition which is molded into a panel and tested in the manner described hereinabove. The results of these tests are set forth in the following Table:

| | |
|---|---|
| Tensile strength _____p.s.i__ | 1030 |
| Elongation at break _____percent__ | 177 |
| Weight loss after 28 days at 135° C. _____do____ | 3.7 |
| Water absorption after 24 hours _____do____ | 0.8 |
| Oil absorption after 1 week immersion at 135° C. _____do____ | 0.6 |

*Example IV*

A polyester resin is prepared in accordance with the procedure described in Example I using the following ingredients.

| Material: | Mols |
|---|---|
| Adipic acid | 8 |
| Fumaric acid | 1 |
| Isophthalic acid | 4 |
| Neopentyl glycol | 7.15 |
| Propylene glycol | 7.15 |

This polyester is blended with filler in the manner described in Example II to form a viscous molding composition which is molded into panels and tested in the manner described in Example II. The molded panels have a tensile strength of 1150 p.s.i. and an elongation of 200% at break. The power factor of the molded composition was 1.14% at 23° C. and 1.42% at 70° C.

*Example V*

A polyester resin is prepared by introducing the following ingredients into a reaction vessel equipped with a stirrer, an inlet for inert gas, and thermometer.

| Material: | Mols |
|---|---|
| Adipic acid | 7.0 |
| Fumaric acid | 1.0 |
| Isophthalic acid | 5.0 |
| Ethylene glycol | 7.15 |
| Neopentyl glycol | 7.15 |

The glycols are charged into the reaction vessel and heated to a temperature of from 140° C. to 160° C. with gas sparging using nitrogen, carbon dioxide, or hydrogen. Approximately half of the isophthalic acid then is added to the glycols and stirring and heating are continued until a clear solution is obtained. The temperature should not be allowed to exceed about 180° C. The remainder of the isophthalic acid then is added with stirring until the solution is clear. The resultant solution then is cooled to about 130° C. to 140° C. at which time the adipic and fumaric acids are added. The mixture then is heated to 225° C. and maintained at that temperature for about 15 to 20 hours until the viscosity of the polyester, as measured with a Brookfield viscometer, is in the range of 2 to 5 million centipoises at 40° C. and the resin has an acid number below 12 and preferably below 5.

*Example VI*

About 55% of the polyester prepared in accordance with the procedure described in Example I then is thoroughly admixed in a double-arm mixer with about 45% of finely divided calcium carbonate having an average particle size of about one micron until a uniform dispersion is achieved. Thereafter, there is added about 1.5% by weight of p-chlorobenzoyl peroxide. After a few more minutes of milling a material of soft, gum-like consistency is obtained. The material was molded at 125° C., with a five-minute cure, into panels 4 inches square having a thickness of about 75 mils. Samples were cut therefrom with an ASTM tensile specimen die D. Cross head speed of the tensile machine was 20 inches per minute and tests were conducted on the samples, at approximately 25° C. Samples had a tensile strength of 935 p.s.i., 962 p.s.i. after two weeks aging and 1108 p.s.i. after four weeks aging; elongation at break of 232%, 225% after two weeks aging and 216% after four weeks aging; a durometer (Shore A) hardness of 56, 62 after two weeks aging and 64 after four weeks of aging at 135° C. in air; a 60 cycle dissipation factor at 100° C. of 12.68, 12.85 after two weeks aging at 135° C. in air and 12.46 after four weeks aging at 135° C. in air. Panels had a water absorption after 24 hours immersion at 25° C. of 0.68% and an oil absorption after seven days at 135° C. in transformer oil of 0.86%. The panels had an $S/D$ value of 55.5, after two weeks' aging a value of 50.5 and a value of 54.8 after four weeks' aging. The $S/D$ value is a figure of merit. It combines the physical factors of tensile strength, elongation and hardness and is calculated from the expression $$S/D = \frac{\text{p.s.i. tensile (percent elongation} \div 100 + 1)}{\text{Durometer}}$$

These test results demonstrate that the elastomeric molding compositions of this invention have outstanding physical and chemical properties.

*Example VII*

A polyester resin is prepared in accordance with the procedure described in Example I using the following ingredients.

| Material: | Mols |
|---|---|
| Adipic acid | 8 |
| Fumaric acid | 1 |
| Isophthalic acid | 4 |
| Ethylene glycol | 7.15 |
| Neopentyl glycol | 7.15 |

The resultant polyester is blended with filler in the manner described in Example II to provide a pasty-like molding composition which is molded into a panel and tested in the manner described hereinabove. The results of these tests are set forth in the following table:

| | |
|---|---|
| Tensile strength _____p.s.i__ | 728 |
| Elongation at break _____percent__ | 287 |
| Weight loss after 28 days at 135° C. _____do____ | 2.8 |
| Weight gain after 24 hours' immersion in water at 25° C. _____do____ | 0.84 |
| Weight gain after 1 week immersion in transformer oil at 135° C. _____do____ | 0.98 |

*Example VIII*

A polyester resin is prepared in accordance with the procedure described in Example I using the following ingredients.

| Material: | Mols |
|---|---|
| Adipic acid | 5.0 |
| Fumaric acid | 1 |
| Isophthalic acid | 7.0 |
| Neopentyl glycol | 7.15 |
| Ethylene glycol | 7.15 |

The polyester is blended with filler in the manner described in Example II to form a viscous molding composition which is molded into panels and tested in the manner described in Example II. The molded panels have a tensile strength of 560 p.s.i. and an elongation of 325% at break. The power factor of the molded composition is 0.9% at 23° C. and 5.9% at 70° C.

*Example IX*

A polyester resin is prepared in accordance with the procedure described in Example I using the following ingredients.

| Material: | Mols |
|---|---|
| Adipic acid | 10 |
| Fumaric acid | 1 |
| Isophthalic acid | 2 |
| Neopentyl glycol | 7.15 |
| Ethylene glycol | 7.15 |

The polyester is blended with filler in the manner described in Example II to form a viscous molding composition which is molded into panels and tested in the manner described in Example II. The molded panels have a tensile strength of 480 p.s.i. and an elongation of 237% at break. The S/D value of the molded composition was 36.8.

*Example X*

A polyester resin is prepared in accordance with the procedure described in Example I using the following ingredients.

| Material: | Mols |
|---|---|
| Adipic acid | 7 |
| Fumaric acid | 1 |
| Isophthalic acid | 5 |
| Neopentyl glycol | 7.15 |
| Ethylene glycol | 2.65 |
| Propylene glycol | 4.5 |

The polyester is blended with filler in the manner described in Example II to form a viscous molding composition which is molded into panels and tested in the manner described in Example II. The molded panels had a tensile strength of 919 p.s.i. and elongation of 285% at break. The S/D value of the molded composition was 61.1.

The elastomeric molding composition of the present invention may be used to insulate transformers, circuit breakers and other electrical apparatus in accordance with procedures well known in the art.

While the present invention has been described with respect to what is at present considered to be preferred embodiments therein, it will be understood, of course, that certain changes, substitutions modifications and the like may be made therein without departing from its true scope.

I claim as my invention:

1. A resinous molding composition which thermosets to a tough and elastomeric solid consisting of an intimate admixture of (A) from 10 to 70 parts by weight of a finely divided filler at least 70% by weight of which is a non-fibrous solid filler of an average particle size no greater than one micron and (B) from 90 to 30 parts by weight of a polyester resin derived by heating above 150° C. but not exceeding 250° C., (a) one mol of at least one unsaturated dicarboxylic acidic compound selected from the group consisting of fumaric acid, maleic acid, maleic anhydride, citraconic anhydride, citraconic acid, itaconic acid, and itaconic anhydride, (b) from 5 to 8 mols of adipic acid, (c) from 2 to 8 mols of isophthalic acid, (d) from 5 to 10 mols of at least one glycol selected from the group consisting of ethylene glycol and propylene glycol, and (e) from 5 to 10 mols of neopentyl glycol, the glycols providing sufficient hydroxyl groups to exceed by at least 5% but not over 15% the number of carboxyl groups in the acidic compounds.

2. The composition of claim 1 wherein the polyester resin is obtained by heating above 15° C. but not over 250° C. the acidic components and the glycols until the polyester has an acid number no higher than 5 and a viscosity as measured on the Gardner-Holdt scale of from about K to M in a 50% monostyrene solution at 25° C.

3. An electrical member comprising an electrical conductor and molded insulation applied thereto, the insulation comprising the tough, elastomeric, thermoset, resinous product derived by molding the composition of claim 1 at about 125° C.

References Cited in the file of this patent

UNITED STATES PATENTS

| 2,340,109 | D'Alelio | Jan. 25, 1944 |
| 2,529,512 | Ott | Nov. 14, 1950 |
| 2,840,538 | Minter | June 24, 1958 |
| 2,871,420 | Minter et al. | Jan. 27, 1959 |

FOREIGN PATENTS

| 588,833 | Great Britain | June 4, 1947 |